United States Patent [19]
Zellerhoff et al.

[11] 3,755,351
[45] Aug. 28, 1973

[54] CARBAMATES OF 2-PHENYLHYDRAZINO-2-IMIDAZOLINES

[75] Inventors: Knut Zellerhoff, Wuppertal-Elberfeld; Siegismund Schütz, Metzkausen; Wilhelm Stendel, Wuppertal-Elberfeld, all of Germany

[73] Assignee: Farbenfabriken Bayer Aktiengesellschaft, Leverkusen, Germany

[22] Filed: Aug. 19, 1971

[21] Appl. No.: 173,290

[30] Foreign Application Priority Data
Aug. 22, 1970 Germany................. P 20 41 734.9

[52] U.S. Cl............................... 260/309.6, 424/273
[51] Int. Cl............................................ C07d 49/34
[58] Field of Search................................ 260/309.6

[56] References Cited
UNITED STATES PATENTS

| | | | |
|---|---|---|---|
| 3,480,630 | 11/1969 | Stahle et al. | 260/309.6 |
| 3,530,140 | 9/1970 | Kummer et al. | 260/309.6 |
| 3,632,602 | 1/1972 | Wilhelm | 260/309.6 |

*Primary Examiner*—Natalie Trousof
*Attorney*—Jacobs & Jacobs

[57] ABSTRACT

Phenylhydrazino-2-imidazoline derivatives bearing a carbalkoxy, carbocycloalkoxy or carbaryloxy group in the $N^1$-position are acaricidal agents. The compounds, of which 2-($N^1$-carbethoxy-$N^2$-phenylhydrazino)-2-imidazoline is a typical embodiment, are prepared by treating the appropriate phenylhydrazino-2-imidazoline with an alkyl, aryl or cycloalkyl haloformate.

24 Claims, No Drawings

CARBAMATES OF 2-PHENYLHYDRAZINO-2-IMIDAZOLINES

DETAILED DESCRIPTION

The present invention pertains to certain derivatives of phenylhydrazino-2-imidazolines and their salts, to process for their production, to their use as acaricides, and to compositions adapted for this use.

The invention provides compound of the formula:

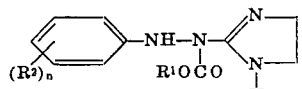

(I)

wherein $R^1$ is alkyl of one to 18 carbon atoms, unsubstituted or substituted by fluoro, chloro, bromo or lower alkoxy, or benzyl; $R^2$ is hydrogen, fluoro, chloro, bromo or lower alkyl, and $n$ has a value of 1 to 3, and the physiologically acceptable acid addition salts thereof.

A preferred group of compounds falling within the above class are those of Formula I wherein $R^1$ is alkyl of one to 18 carbon atoms, unsubstituted or substituted by chloro or lower alkoxy, or benzyl, and $R^2$ is hydrogen, chloro or lower alkyl.

The invention also pertains to compounds of formula I wherein $R^2$ is chloro and $n$ is 1 or 2 or $R^2$ is hydrogen.

The salts of the present invention include those of inorganic acids and of organic acids. If the compounds are to be applied as animal ectoparasiticides, it will of course be desirable that such salts should be physiologically acceptable salts, i.e. of nontoxic acids. Examples of inorganic acids include the hydrogen halides and phosphoric acid, the compounds being for example salts of hydrochloric acid or phosphoric acid respectively. Suitable organic acids include nontoxic carboxylic and sulfonic acids. When employed in the present specification and claims, the term "lower alkyl" refers to a straight or branched hydrocarbon chain of from one to six carbon atoms, preferably one to four carbon atoms, such as methyl, ethyl, propyl, isopropyl, n-butyl, tert. butyl, pentyl, hexyl and the like. The term "lower alkoxy" refers to such groups bound to the remainder of the molecule through an oxygen ether bond such as methoxy, ethoxy, propoxy, butoxy and the like. The term "lower alkylthio" refers to the corresponding thioethers such as methylthio, ethylthio, propylthio, etc. The term "lower alkenyl" refers to a hydrocarbon chain of from two to six carbon atoms bearing at least one non-terminal ethylenic double bond such as allyl, 2,2-dimethylvinyl, crotyl and the like. Aryl refers to an aromatic group of six or 12 carbon atoms such as phenyl, biphenyl or naphthyl while aryloxy refers to the corresponding groups bound to the remainder of the molecule through an oxygen ether bond. Cycloalkyl of three to six carbon atoms includes cyclopropyl, cyclobutyl, cyclopentyl and cyclohexyl.

The compounds of this invention are outstandingly suitable for combatting acarids, especially animal ectoparasites. In contrast to the unsubstituted phenylhydrazino-2-imidazoline (see for example J. Chem. Soc. 1965, 474–79), a distinct activity against ticks, especially against resistant ticks (towards agents heretofore used), can be observed with the compounds according to the invention.

The invention also provides a process for the production of a compound according to the invention in which a phenylhydrazino-2-imidazoline, described for example in U.S. Pat. No. 3,480,630, of the following formula:

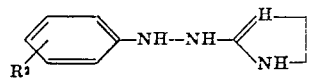

(II)

in which $R^2$ has the abovementioned meaning, or a salt thereof is allowed to react with a compound of the formula:

$$R^1 - O - CO - X \quad \text{(III)}$$

in which $R^1$ is as defined above, and

X represents any replaceable radical such as fluoro, chloro or bromo, or an organic radical such as —O—R or —O—CO—O—R in which R is as defined above for $R^1$ or a different alkyl or aryl radical.

The reaction of the 2-phenylhydrazino-2-imidazoline with the carbonic acid derivative of formula (III) can be effected with or without the use of a solvent, optionally in the presence of a base such as an alkali metal hydroxide, an alkali metal carbonate or a tertiary organic base, and generally at temperatures of from about 0°C to about 120°C, preferably from 0° to 60°C. The 2-phenylhydrazino-2-imidazolines can be used in the form of salts, especially the hydrohalides. Preferably the reaction is executed in the absence of oxygen. In many cases it is advantageous to carry out the process in two-phase systems, which can, for example, consist of a water-immiscible solvent such as chloroform, other halogenated hydrocarbons or aromatic hydrocarbons, and an aqueous phase such as water.

The phenylhydrazino-2-imidazolines of the present invention, when manufactured according to the process described above, are obtainable in excellent yield and purity. They are colorless solids and form salts with hydrogen halides or phosphoric acid or acid phosphates such as $NaH_2PO_4$ or $Ca(H_2PO_4)_2$ or sulfuric acid, as well as with organic carboxylic acids and sulfonic acids. These salts can be employed in the same way as the free bases in the use according to the invention, provided of course that the acids used for salt formation are toxicologically harmless when applied to animals to free them or protect them from ectoparasites, i.e. the salts are physiologically acceptable.

It can be shown by chemical and spectroscopic methods that the products obtained by the present process possess the same structure as in formula (I) and that substitution does not occur at the other nitrogen atoms of the molecule or only occurs to a minor extent.

The compounds display strong acaricidal properties, especially towards those acarids which attack domesticated animals, such as cattle and sheep, as ectoparasites. They are therefore very suitable for combatting animal ectoparasites of the order of the acarids. As economically important ectoparasites of this nature, which play a major role especially in tropical and subtropical countries, there may for example be mentioned the Australian and South American cattle tick, Boophilus microplus, the South African cattle tick, Boophilus decoloratus, and multi-host cattle ticks and sheep ticks of the genera Rhipicephalus, Amblyomma and Hyalomma, all from the family Ixodidae, representatives of the family Sarcoptidae, such as the sheep scab mite, Psoroptes ovis, and the rabbit ear mite, Psoroptes cuniculi.

Over the course of time, ticks have, in various areas, become resistant towards the phosphoric acid esters and carbamates hitherto used for combatting them, so that the success in combatting them has become doubtful in many areas. To ensure economical animal raising in the areas where attack occurs, acaricidal agents which are effective against resistant strains, for example those encountered in the genus Boophilus, are desired. For example, in Australia the Ridgeland strain and the Biarra strain of Boophilus microplus have become highly resistant to the phosphoric acid esters and carbamates hitherto used. The phenylhydrazino-2-imidazoline derivatives of the present invention prove to be equally effective both against the normally sensitive strains and against the resistant strains. They greatly inhibit the deposition of eggs by the adult forms and lead to a rapid dropping off of all tick stages present on the animal.

The phenylhydrazino-2-imidazoline derivatives of the present invention can be conveniently employed in acaricidal formulations, such as solutions, emulsions, suspensions, powders, pastes and granulates. These can be produced in the usual fashion, as for example by mixing the phenylhydrazino-2-imidazoline derivatives with extenders, that is, liquid, solid or liquefied gaseous diluents or carriers, optionally with the use of surface-active agents, such as emulsifying agents or dispersing agents. Suitable liquid diluents or carriers include aromatic hydrocarbons such as xylenes, toluene, benzene or alkylnaphthalenes; chlorinated aromatic or aliphatic hydrocarbons such as chlorobenzenes, chloroethylenes or methylene chloride; aliphatic hydrocarbons such as cyclohexane, paraffins, as for example mineral oil fractions; alcohols such as butanol or glycol; the corresponding ethers and esters; ketones such as acetone, methyl ethyl ketone, methyl isobutyl ketone or cyclohexanone; strongly polar solvents such as dimethylformamide, dimethylsulfoxide and acetonitrile; and water. In the case of the use of water as an extender, organic solvents can also be used as auxiliary solvents.

Liquefied gaseous diluents or carriers include liquids which are gaseous at normal temperatures and pressures, most notably aerosol propellants such as halogenated hydrocarbons, e.g. freon.

Solid diluents or carriers include ground natural minerals such as kaolins, clays, talc, chalk, quartz, attapulgite, montmorillonite and diatomaceous earth, and ground synthetic minerals such as highly dispersed silicic acid, alumina and silicates.

Suitable emulsifying agents include nonionic and anionic emulsifiers such as polyoxyethylene-fatty acid esters, polyoxyethylene-fatty alcohol ethers for example alkylaryl-polyglycol ethers, alkyl sulfonates, alkyl sulfates and aryl sulfonates. Dispersing agents include lignin, sulfite waste liquors and methyl cellulose.

The compositions generally contain 0.1 to 95 percent by weight of the phenylhydrazino-2-imidazoline derivative, in form ready for use or to be appropriately diluted prior to actual application. Other auxiliaries or active substances, such as insecticides or disinfectants, can also be admixed with the formulations or the ready-to-use solutions.

The phenylhydrazino-2-imidazoline derivative, either pure compound or a composition containing the pure compound is applied in the usual manner, as for example by powdering, spraying, watering or atomizing, or as a dip.

The invention therefore provides an acaricidal composition containing as active ingredient a phenylhydrazino-2-imidazoline derivative according to the invention in admixture with a solid or liquefied gaseous diluent or carrier or in admixture with a liquid diluent or carrier containing a surface-active agent.

The invention also provides a method of combatting acarid pests, as well as a method of freeing or protecting animals from ectoparasites, which comprise applying to the pests or a habitat thereof a phenylhydrazine-2-imidazoline derivative according to the invention, alone or as a composition containing the active ingredient in admixture with a diluent or carrier.

The invention is further illustrated by the following examples, in which parts are expressed by weight and temperature is expressed in degrees Centigrade.

EXAMPLE A

In vitro test on ticks/Inhibition of egg-production.

Three parts of the indicated phenylhydrazino-2-imidazoline derivative are mixed with seven parts of a mixture of equal parts of ethylene glycol monomethyl ether and nonylphenol polyglycol ether. The emulsion concentrate thus obtained is diluted with water to the indicated concentration. Adult fully engorged female ticks of the species Boophilus microplus (resistant) are dipped for one minute into this active substance preparation. After dipping 10 female specimens of each of the various tick strains, the individual ticks are transferred into plastic dishes, the bottoms of which are covered with filter paper discs. After 28 days, the effectiveness of the active substance preparation is assessed by determining the inhibition of the deposition of fertile eggs, as compared to the deposition of eggs of untreated control ticks. The effect is indicated in percent, 100 percent denoting that no fertile eggs were laid and 0 percent denoting that the ticks laid eggs corresponding to the untreated control.

The results are shown in Table 1:

TABLE 1
In vitro test on ticks/inhibition of egg-production

| Active substance | Concentration causing inhibition of egg-production of Boophilus microplus (Biarra strain) | |
|---|---|---|
| | 100% inhibition | >50% inhibition |
| [imidazoline]–N–HN–[phenyl-COOC$_2$H$_5$] · HCl | 0.3 | 0.1 |
| [imidazoline]–N–NH–[phenyl-COOCH$_3$] · HCl | 1.0 | 0.3 |
| [imidazoline]–N–HN–[phenyl-COO–CH$_2$–OH$_2$–CH$_2$–CH$_3$] · HCl | 0.1 | 0.03 |

TABLE 1—Continued
In vitro test on ticks/inhibition of egg-production

| Active substance | 100% inhibition | >50% inhibition |
|---|---|---|
| [imidazoline-N-N(COOCH₂-CH₂-CH₃)-HN-phenyl]·HCl | 0.03 | 0.02 |
| [imidazoline-N-N(COO-CH(CH₃)-CH₂-CH₃)-NH-phenyl] | 0.3 | 0.1 |
| [imidazoline-N-N(COOCH₂-(CH₂)₁₆-CH₃)-HN-phenyl]·HCl | 1.0 | 0.8 |
| [imidazoline-N-N(COOCH₂-(CO₂)₇-CH₃)-HN-phenyl]·HCl | 0.03 | 0.01 |
| [imidazoline-N-N(COO-(CH₂)₁₁-CH₃)-HN-phenyl]·HCl | 0.03 | 0.01 |
| [imidazoline-N-N(COO-(CH₂)₇-CH₃)-HN-phenyl]·HCl | 0.1 | 0.03 |
| [imidazoline-N-N(COO-(CH₂)₅-CH₃)-HN-phenyl]·HCl | 0.1 | 0.03 |
| [imidazoline-N-N(COO-(CH₂)₉-CH₃)-HN-phenyl]·HCl | 0.03 | 0.01 |
| [imidazoline-N-N(COO-(CH₂)₁₀-CH₃)-HN-phenyl]·HCl | 0.03 | 0.01 |
| [phenyl-NH-N(imidazoline)-CO-O-CH₂-CH₂-O-CH₃]·HCl | 0.3 | 0.2 |
| [Cl,Cl-phenyl-NH-N(imidazoline)-O-C(=O)-C₄H₉-n] | 0.3 | 0.1 |
| [imidazoline-N-N(COO-CH(CH₃)₂)-HN-vinyl]·HCl | 1.0 | 0.8 |

TABLE 1—Continued
In vitro test on ticks/inhibition of egg-production

| Active substance | 100% inhibition | >50% inhibition |
|---|---|---|
| [imidazoline-N-N(COO-CH₂-(CH₂)₃-CH₃)-HN-phenyl]·HCl | 0.1 | 0.04 |
| [imidazoline-N-N(COO-(CH₂)₁₃-CH₃)-HN-phenyl]·HCl | 0.03 | 0.01 |
| [imidazoline-N-N(COO-CH₂-(CH₂)₁₄-CH₃)-HN-phenyl]·HCl | 0.1 | 0.03 |
| [Cl,Cl-phenyl-NH-N(imidazoline)-CO-O-(CH₂)₃-CH]·HCl | — | 1.0 |

EXAMPLE 1

2-($N^1$-propyloxy-carbonyl-$N^2$-phenyl-hydrazino)-2-imidazoline hydrochloride 25.7 g of 2-($N^2$-phenylhydrazino)-2-imidazoline hydrobromide (0.1 mol) were suspended in 200 ml of chloroform under nitrogen, and 25 ml of 45 per cent strength sodium hydroxide solution were added while stirring. After complete solution has occurred, 13.5 g of chloroformic acid n-propyl ester (0.11 mol), dissolved in 20 ml of chloroform, were added dropwise, and after 20 minutes the chloroform phase was separated off, dried over sodium sulphate and concentrated in vacuo. Ether was added to the liquid residue and the crystals were filtered off, suspended in ethanol, and converted into the hydrochloride by means of hydrochloric acid in ether. Melting point 155°.

The following were manufactured analogously:

2-($N^1$-methoxy-carbonyl-$N^2$-phenyl-hydrazino)-2-imidazoline, hydrochloride, melting point 139°.

2-($N^1$-ethyloxy-carbonyl-$N^2$-phenyl-hydrazino)-2-imidazoline hydrochloride, melting point 158°.

2-($N^1$-iso-propyloxy-carbonyl-$N^2$-phenyl-hydrazino)-2-imidazoline hydrochloride, melting point 160°.

2-($N^1$-n-butyloxy-carbonyl-$N^2$-phenyl-hydrazino)-2-imidazoline hydrochloride, melting point 140°.

2-($N^1$-sec.-butyloxy-carbonyl-$N^2$-phenyl-hydrazino)-2-imidazoline, melting point 135°.

2-($N^1$-n-pentyloxy-carbonyl-$N^2$-phenyl-hydrazino)-2-imidazoline hydrochloride, melting point 122–23°.

2-($N^1$-n-hexyloxy-carbonyl-$N^2$-phenyl-hydrazino)-2-imidazoline hydrochloride, melting point 115°–16°.

2-($N^1$-n-octyloxy-carbonyl-$N^2$-phenyl-hydrazino)-2-imidazoline hydrochloride, melting point 117°–18°.

2-($N^1$-n-nonyloxy-carbonyl-$N^2$-phenyl-hydrazino)-2-imidazoline hydrochloride, melting point 114°–15°.

2-($N^1$-n-decyloxy-carbonyl-$N^2$-phenyl-hydrazino)-2-imidazoline hydrochloride, melting point 114°–15°.

2-($N^1$-n-undecyloxy-carbonyl-$N^2$-phenyl-hydrazino)-2-imidazoline hydrochloride, melting point 125°–26°.

2-(N¹-n-dodecyloxy-carbonyl-N²-phenyl-hydrazino)-2-imidazoline hydrochloride, melting point 111°–12°.

2-(N¹-n-tetradecyloxy-carbonyl-N²-phenyl-hydrazino-2-imidazoline hydrochloride, melting point 104°.

2-(N¹-n-hexadecyloxy-carbonyl-N²-phenyl-hydrazino)-2-imidazoline hydrochloride, melting point 111°–13°.

2-(N¹-n-octadecyloxy-carbonyl-N²-phenyl-hydrazino)-2-imidazoline hydrochloride, melting point 90°.

2-[N¹-(2-methoxy-ethyloxy-carbonyl)-N²-phenyl-hydrazino]-2-imidazoline hydrochloride, melting point 162°.

2-[N¹-n-butyloxy-carbonyl-N²-(3,4-dichlorophenyl)-hydrazino]-imidazoline hydrochloride, melting point 1-64°–65°.

2-[N¹-n-butyloxy-carbonyl-N²-(2-methyl-4-chlorophenyl)-hydrazino]-2-imidazoline hydrochloride, melting point 170°.

EXAMPLE 2

2-(N¹-benzyloxy-carbonyl-N²-phenyl-hydrazino)-imidazoline 25.7 g of 2-(N²-phenylhydrazino)-imidazoline hydrobromide (0.1 mol) were suspended in 200 ml of chloroform under nitrogen, and 25 ml per cent strength sodium hydroxide solution were added at 40°. After solution had occurred, 17.0 g of chloroformic acid benzyl ester (0.11 mol) were added dropwise at 20°, and after a further 20 minutes the chloroform phase was separated off and dried over potassium carbonate. After filtering off and concentrating the solution, ether was added. Colorless crystals, melting point 129°, decomposition.

The following were manufactured analogously:

2-[N¹-n-butyloxy-carbonyl-N²-(2-chlorophenyl)-hydraxino]-imidazoline, melting point 78°–80°.

2-[N¹-n-butyloxy-carbonyl-N²-(2,4,6-trichlorophenyl)-hydrazino]-imidazoline, melting point 98°.

2-[N¹-ethyloxy-carbonyl-N²-(2,4,6-trichlorophenyl)-hydrazino]-2-imidazoline, melting point 155°.

What is claimed is:

1. A compound selected from the group consisting of a phenylhydrazino-2-imidazoline of the formula:

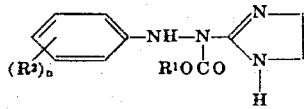

wherein

R¹ is alkyl of one to 18 carbon atoms, unsubstituted or substituted by fluoro, chloro, bromo or lower alkoxy, or benzyl;

R² is hydrogen, fluoro, chloro, bromo, or lower alkyl, and n has a value of 1 to 3, and the physiologically acceptable acid addition salts thereof.

2. A compound according to claim 1 wherein
R¹ is alkyl of one to 18 carbon atoms, unsubstituted or substituted by chloro or lower alkoxy, or benzyl; and
R² is hydrogen, chloro or lower alkyl.

3. A compound according to claim 1 wherein R² is chloro and n is 1.

4. The compound according to claim 3 wherein R² is chloro in the ortho-position and R¹ is n-butyl.

5. A compound according to claim 1 wherein R² is chloro and n is 2.

6. The compound according to claim 5 wherein R² is chloro in the meta and para-positions and R¹ is n-butyl.

7. A compound according to claim 1 wherein R² is hydrogen.

8. The compound according to claim 7 wherein R¹ is methyl.

9. The compound according to claim 7 wherein R¹ is ethyl.

10. The compound according to claim 7 wherein R¹ is n-propyl.

11. The compound according to claim 7 wherein R¹ is n-butyl.

12. The compound according to claim 7 wherein R¹ is sec-butyl.

13. The compound according to claim 7 wherein R¹ is isopropyl.

14. The compound according to claim 7 wherein R¹ is n-pentyl.

15. The compound according to claim 7 wherein R¹ is n-hexyl.

16. The compound according to claim 7 wherein R¹ is n-octyl.

17. The compound according to claim 7 wherein R¹ is n-nonyl.

18. The compound according to claim 7 wherein R¹ is n-decyl.

19. The compound according to claim 7 wherein R¹ is n-undecyl.

20. The compound according to claim 7 wherein R¹ is n-dodecyl.

21. The compound according to claim 7 wherein R¹ is n-tetradecyl.

22. The compound according to claim 7 wherein R¹ is n-hexadecyl.

23. The compound according to claim 7 wherein R¹ is n-octadecyl.

24. The compound according to claim 7 wherein R¹ is β-methoxyethyl.

* * * * *